(12) United States Patent
Pedrini

(10) Patent No.: US 9,604,116 B2
(45) Date of Patent: Mar. 28, 2017

(54) BICYCLE SIMULATOR FOR STATIC OR PSEUDO-STATIC USE

(76) Inventor: Fabio Pedrini, Bologna (IT)

( * ) Notice: Subject to any disclaimer, the term of this patent is extended or adjusted under 35 U.S.C. 154(b) by 180 days.

(21) Appl. No.: 14/004,493

(22) PCT Filed: Mar. 21, 2012

(86) PCT No.: PCT/IB2012/051338
§ 371 (c)(1),
(2), (4) Date: Oct. 24, 2013

(87) PCT Pub. No.: WO2012/127421
PCT Pub. Date: Sep. 27, 2012

(65) Prior Publication Data
US 2014/0045657 A1     Feb. 13, 2014

(30) Foreign Application Priority Data
Mar. 22, 2011   (IT) .............................. TO2011A0247

(51) Int. Cl.
*A63B 21/005*      (2006.01)
*A63B 21/22*       (2006.01)
(Continued)

(52) U.S. Cl.
CPC .......... *A63B 69/16* (2013.01); *A63B 21/0053* (2013.01); *A63B 21/0054* (2015.10);
(Continued)

(58) Field of Classification Search
CPC .. A63B 22/08; A63B 21/0058; A61H 1/0214; B62H 1/10–1/12; B62H 7/00;
(Continued)

(56) References Cited

U.S. PATENT DOCUMENTS 4,272,094 A  *  6/1981  Patrin .......................... 280/217
4,712,806 A  *  12/1987  Patrin .......................... 280/217
(Continued)

FOREIGN PATENT DOCUMENTS

CN        2440542       8/2001
CN        1873734       12/2006
(Continued)

OTHER PUBLICATIONS

CN201280014303.8, Office Action dated Aug. 25, 2015, 14 pages, and English translation, 25 pages.

*Primary Examiner* — Loan H Thanh
*Assistant Examiner* — Jennifer M Deichl
(74) *Attorney, Agent, or Firm* — Boyle Fredrickson, S.C.

(57) ABSTRACT

A bicycle simulator (1) is basically constituted by a bicycle pre-arranged for static or pseudo-static use. The bicycle comprises front and rear supports (13, 14) for resting on the floor (12) that simulate the contact of the wheels of a normal bicycle on the road. The two supports are preferably constituted by a front supporting wheel (13) and by a rear supporting wheel (14) that rest on the floor and support in a freely rotatable way the respective wheel axles (3, 11). Rotatably mounted within at least the front supporting wheel is a flywheel (F1, F2). The front flywheel (F1) is set in rotation by a respective electric motor (M) or by a transmission driven by the pedals, for creating a stabilizing gyroscopic effect, which enables the user to maintain his balance when pedaling with the bicycle stationary, resting on the floor via the supporting wheels in a static condition. The crank axle is connected to a driven member, which is independent of said front support (13) and of said rear support (14) and is constituted by a rear flywheel or even by the front flywheel itself.

20 Claims, 4 Drawing Sheets

(51) Int. Cl.
*A63B 22/06* (2006.01)
*A63B 26/00* (2006.01)
*A63B 69/16* (2006.01)
*B62H 7/00* (2006.01)
*B62M 1/00* (2010.01)
*B62M 1/10* (2010.01)

(52) U.S. Cl.
CPC ........ *A63B 21/0058* (2013.01); *A63B 21/225* (2013.01); *A63B 22/0605* (2013.01); *B62H 7/00* (2013.01); *B62M 1/00* (2013.01); *B62M 1/10* (2013.01); *A63B 26/003* (2013.01); *A63B 2022/0641* (2013.01); *A63B 2069/163* (2013.01); *A63B 2069/165* (2013.01)

(58) Field of Classification Search
CPC ........ B62M 1/10; B62M 6/65; B60L 11/1851; B60L 11/1861
USPC .................................. 280/212, 217; 601/36
See application file for complete search history.

(56) References Cited

U.S. PATENT DOCUMENTS

| | | | | |
|---|---|---|---|---|
| 4,743,012 | A * | 5/1988 | Kim | 482/61 |
| 6,355,996 | B1 * | 3/2002 | Birkestrand | 310/54 |
| 8,251,390 | B2 * | 8/2012 | Reichstetter et al. | 280/217 |
| 2003/0073546 | A1 * | 4/2003 | Lassanske et al. | 482/63 |
| 2007/0001423 | A1 * | 1/2007 | Murnen et al. | 280/217 |
| 2007/0049467 | A1 | 3/2007 | Lin | |
| 2010/0090440 | A1 | 4/2010 | Reichstetter et al. | |
| 2010/0234188 | A1 * | 9/2010 | Wan | 482/61 |

FOREIGN PATENT DOCUMENTS

| | | |
|---|---|---|
| CN | 200991523 | 12/2007 |
| CN | 101353071 | 1/2009 |
| DE | 8804997 | 9/1988 |
| GB | 2409843 | 7/2005 |
| WO | 03045508 | 6/2003 |

* cited by examiner

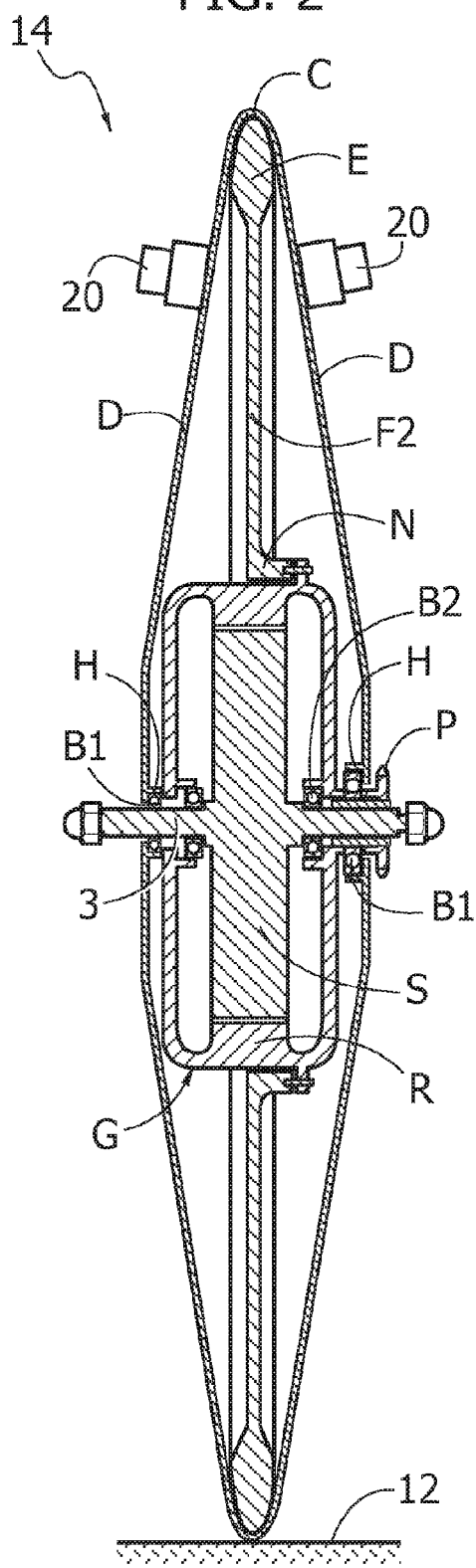
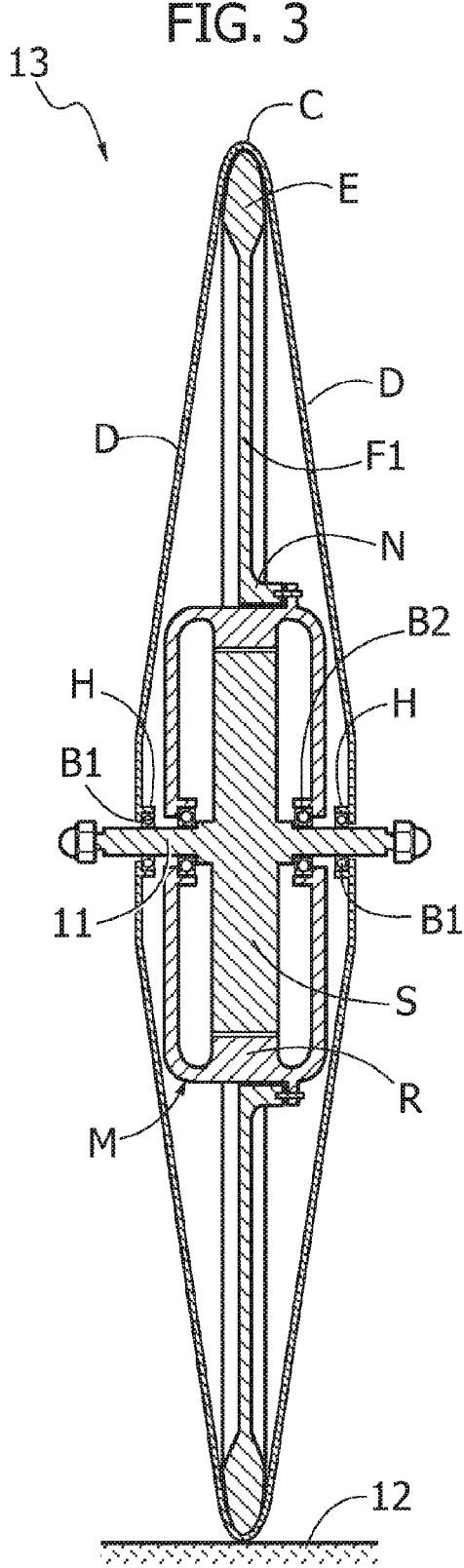

BICYCLE SIMULATOR FOR STATIC OR PSEUDO-STATIC USE

BACKGROUND AND SUMMARY OF THE INVENTION

The present invention relates to a bicycle simulator, namely, a static device designed to simulate use of a bicycle on the road.

Stationary bicycles for training of a conventional type comprise a rigid structure provided with base supports for resting thereof on a floor and a flywheel, which is carried by said structure and can be driven in rotation by the user by means of pedals, and is subject to the action of adjustable braking means. Training bicycles of this type are very widespread, but are not totally satisfactory, in the first place because their use gives to the user a sensation that is markedly different from that of normal riding of a bicycle on the road, where the cyclist must instead pay attention to maintaining a position of balance of the bicycle on the two points of contact of the wheels with the road. The total staticity of the structure of stationary training bicycles hence deprives the user of any need to pay attention to balance and renders use of the bicycle decidedly boring, with the consequence, proven by experience, that the use of training bicycles is often more tiring than that of a normal bicycle.

As an alternative to training bicycles of the type described above also very widespread are roller devices that enable use in a static position of a normal bicycle for use on roads. Said devices normally envisage that the bicycle rests on a floor with its front wheel and is instead kept with its rear wheel raised off the floor by means of a support on which the rear-wheel axle rests. The rear wheel engages a roller carried by the aforesaid support and pushed against the rear wheel with an adjustable force. Also in the case of said roller devices the sensation of the user during use is markedly different from that experienced during normal riding of a bicycle on the road, once again basically because the bicycle is kept by the aforesaid rear support in a stable rigid position.

In an attempt to provide bicycle simulators designed to give the user a sensation closer to that of real riding of a bicycle on the road, solutions have been proposed in which the frame of the bicycle simulator is supported in an articulated way on a base structure that rests on the floor, in such a way that it can tilt laterally. Bicycle simulators of this type are, for example, described in US 2007/0072744 A1 and in US 2008/0020908 A1. The frame of said bicycle simulators supports in a rotatable way a flywheel that can be driven in rotation via the pedals. Once again according to what is illustrated in said documents, rotation of the flywheel creates a gyroscopic balancing effect that helps the user to keep the frame of the bicycle simulator in the vertical position of equilibrium. Bicycle simulators of this type reproduce more closely the sensation of real riding of a bicycle on the road, but do not achieve said target fully in so far as the articulated connection between the base structure and the top frame is in any case far from able to simulate effectively the situation of the contact of the wheels on the road of a real bicycle.

It should also be noted that it is in general known to provide a conventional bicycle with a motor-driven flywheel to obtain a gyroscopic balancing effect that can help, for example, children or elderly people to find the right balance during use of a real bicycle on the road. Solutions of this type are illustrated in DE-U-88 04 997, U.S. Pat. Nos. 7,314,225 B2, and 4,712,806.

The object of the present invention is to provide a bicycle simulator that will reproduce for the user a sensation substantially identical to that of real riding of a bicycle on the road.

A further object of the invention is to provide a bicycle simulator that will have a general structure that is substantially identical or at least very similar to that of a real bicycle.

A further object of the invention is to propose a bicycle simulator that can be produced with technologies similar to those normally used in the production of bicycles and that will be efficient and reliable in operation.

The above and further objects are achieved, according to the invention, by providing a bicycle simulator comprising a bicycle structure including a bicycle frame, a rear-wheel axle carried by the frame, a crank axle carried in a rotatable way by the frame and provided with cranks and corresponding pedals, a head tube carried by the frame and a steering shaft rotatably mounted in the head tube and carrying a fork, and a front-wheel axle carried by the fork, said bicycle simulator further comprising a front support and a rear support for supporting the bicycle simulator on a floor, said front and rear supports being associated, respectively, to the front-wheel axle and to the rear-wheel axle and having each a portion of contact with the floor shaped in such a way as to simulate the contact with the road of the wheel of a bicycle, at least one front flywheel rotatably mounted on said front-wheel axle, and motor means associated to said front flywheel for setting it in rotation in order to create a stabilizing gyroscopic effect, said crank axle being designed to impart a rotation on a driven member, which is independent of said front support and said rear support.

In a preferred embodiment, said front and rear supports are constituted by two static wheels, provided for resting on the floor.

Once again in the case of said preferred embodiment, the bicycle simulator comprises a rear flywheel supported in rotation on said rear-wheel axle and connected to said crank axle by a transmission, and moreover provided are means for braking rotation of said rear rotor.

Once again in the case of the preferred embodiment, said motor means associated to the front flywheel are constituted by an electric motor. Provided on board the bicycle simulator is a battery for supply of said electric motor for actuation of the front flywheel, and said rear flywheel is mechanically connected to an electric generator provided for recharging said battery.

The bicycle simulator according to the present invention is able to give the user a sensation altogether similar to that of real riding of a bicycle on the road. In the case of the preferred embodiment, rotation of the front flywheel can be activated, via the aforesaid motor means, also before the user climbs on the bicycle simulator, to facilitate him in finding a condition of balance even before he starts pedaling. Of course, when the user has started pedaling, the rotation impressed on the rear flywheel creates a gyroscopic effect that adds to the one caused by the front flywheel, further favouring balance. In any condition of use, the contact between the floor and the front and rear supporting wheels is altogether similar to the contact of the wheels of a normal bicycle with the road, except for the fact that said supporting wheels are stationary.

The invention can be produced so as to enable a non-totally static use of the bicycle, but rather a pseudo-static use, where said expression is used to indicate a condition in which the bicycle simulator advances by a distance of the order of centimeters or a few meters in the course of a training session. Said result is obtained, in the case of the preferred embodiment, thanks to the fact that the rear flywheel is made of metal material and that associated to the rear supporting wheel is at least one permanent magnet rigidly connected to said wheel, at a distance from the axle of the wheel, in such a way that rotation of the rear flywheel is transmitted to said rear supporting wheel with a very low transmission ratio, in such a way that, as has been said, the bicycle simulator has a pseudo-static behaviour, i.e., it advances along the floor by a distance of the order of centimeters or a few meters in the course of a training session. Preferably, the permanent magnet is fixed on the rear wheel at an adjustable distance from the plane of the flywheel to enable variation of said transmission ratio.

In a variant, the motor means are constituted by a mechanical transmission, for example with chains and/or belts, which connects the crank axle to the front flywheel. In this case, preferably, the rear flywheel is not envisaged. It is consequently the front flywheel itself that functions as member driven by the crank axle. Once again in the case of said variant, as likewise in the case of any other embodiment of the invention, there may be envisaged a pseudo-static operation of the bicycle simulator by associating to the crank axle a friction-driven roller, in contact with the peripheral edge of the static rear supporting wheel, in such a way as to transmit a very slow movement to said wheel (one degree of rotation of the rear supporting wheel every n revolutions of the pedal) with a very low transmission ratio so that said bicycle simulator presents the pseudo-static behaviour described above.

It is evident that the bicycle simulator according to the invention offers the user possibilities of exercise and pleasure that cannot be obtained with any of the bicycle simulators produced up to the present day. In addition, the bicycle simulator according to the invention presents the advantage that it can be derived with relatively simple and low-cost operations from a conventional bicycle structure.

BRIEF DESCRIPTION OF THE DRAWINGS

Further characteristics and advantages of the invention will emerge from the ensuing description with reference to the annexed drawings, which are provided purely by way of non-limiting example, and in which:

FIGS. 2 and 3 are cross-sectional views of the supporting wheels of the bicycle simulator of FIG. 1, according to the lines II-II and III-III of FIG. 1, at an enlarged scale;

DETAILED DESCRIPTION

Figure 1:
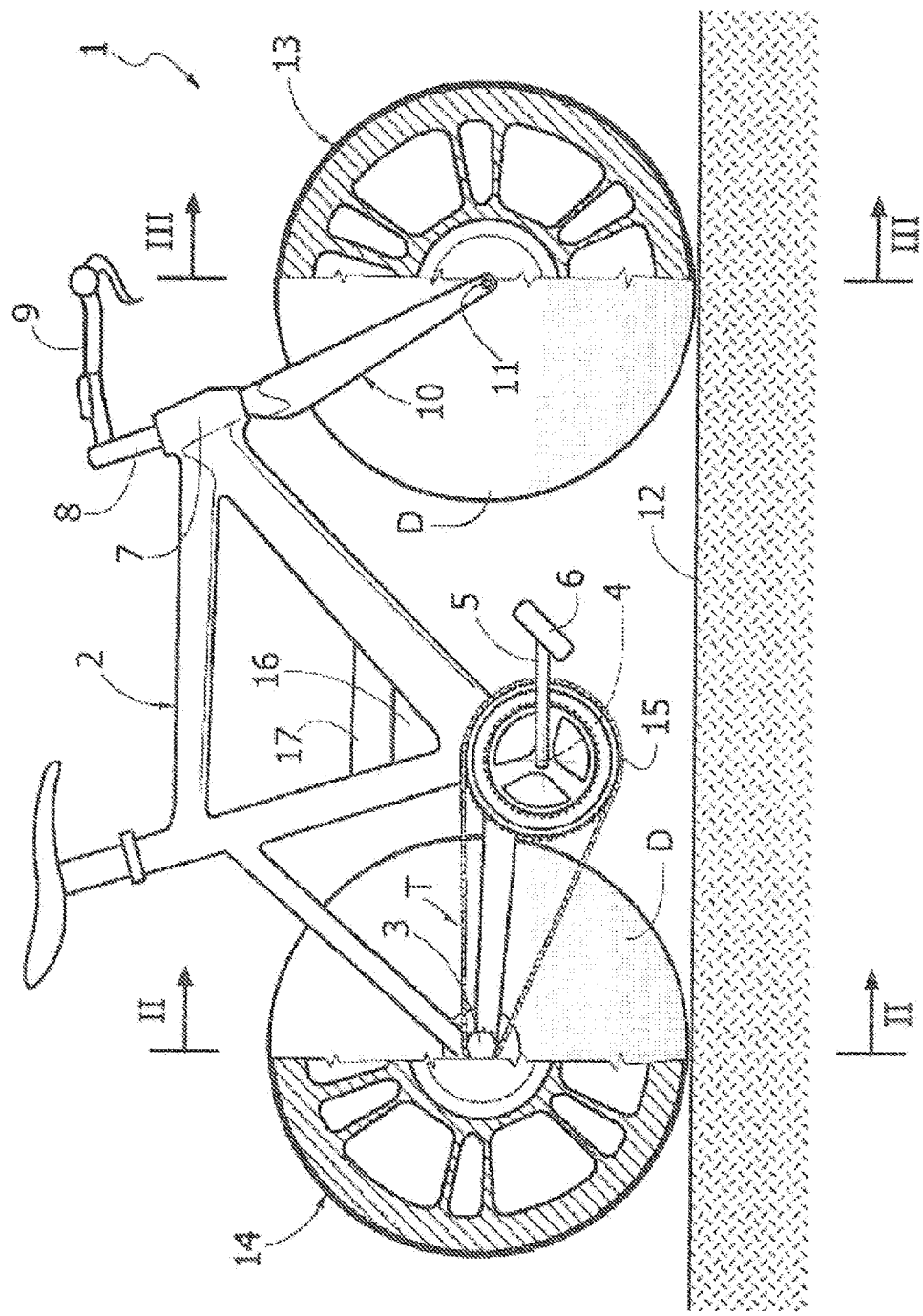
FIG. 1 is a partially sectioned side view of a bicycle simulator according to a preferred embodiment of the invention.

In FIG. 1, the reference number 1 designates a bicycle simulator according to the invention comprising a conventional bicycle structure, with a frame 2 that supports in a rotatable way a rear-wheel axle 3 and a crank axle 4 associated to which are two cranks 5, each provided with a respective pedal 6. Once again in a way similar to what is envisaged in a conventional bicycle structure, the frame 2 includes a head tube 7, rotatably mounted in which is a steering shaft 8, which is provided with a handlebar 9 and is connected in rotation to a fork 10, the branches of which have their ends that support in a rotatable way a front-wheel axle 11. The frame 2 carries a saddle, preferably provided with a height-adjustment device, of any known type.

In the case of the preferred embodiment illustrated herein, the bicycle simulator is supported on a floor 12 by means of a front supporting static wheel 13 and a rear supporting static wheel 14, which have a structure similar to that of disk (or lenticular) wheels for conventional racing bicycles, except for the fact that they are without tyres. As may be seen more clearly in FIGS. 2 and 3, each of the supporting wheels 13, 14 comprises two opposite disks set at a distance D apart and connected together along the outer circumferential periphery via a circumferential portion C having, in the cross section represented in FIGS. 2 and 3, a curved profile that simulates the profile of a tyre, in order to reproduce the type of contact between the wheel of a conventional bicycle and the road. The two disks D of each wheel 13 and 14 have hubs H at the centre that are mounted in a freely rotatable way, by means of rolling bearings B1, on the respective axles 3 and 11.

The bicycle simulator 1 consequently rests on the floor 12 via the front supporting static wheel 13 and the rear supporting static wheel 14 with a contact altogether similar to that of the wheels of a conventional bicycle, for example a racing bicycle, on the road.

Within each of the wheels 13, 14, in the space defined between the two opposite disks D, a flywheel is provided, designated respectively by F1 and F2.

The flywheels F1, F2 are each in the form of a disk, with a part E that is widened along the outer periphery and a hub N.

The hub N of the front flywheel F1 is rigidly connected about the annular rotor R of an electric motor M of the in-wheel type. The rotor R of the motor M is rotatably mounted on the axle 11 via rolling bearings B2. Set within the rotor R is the stator S of the motor, which is rigidly connected to the axle 11.

The hub N of the rear flywheel F2 is rigidly connected about the annular rotor R of an electric generator G, which is also of the in-wheel type. The rotor R of the generator G is rotatably mounted on the axle 3 via rolling bearings B2. Set within the rotor R is the stator S of the generator, which is rigidly connected to the axle 11.

The details of construction of the motor M and of the generator G are not illustrated herein in so far as the motor M and the generator G are of any type in itself known.

As may be seen in FIG. 2, moreover, in the case of the rear flywheel F2, the structure of the rotor R is connected in rotation to a pinion P engaging on which is a transmission chain T (FIG. 1) that connects said pinion to a crank wheel 15 associated to the crank axle 4 of the bicycle. Consequently, the movement impressed by the pedals imparts a rotation on a driven member (the rotor R), which is independent of the rear support 14 and of the front support 13.

Figure 4:
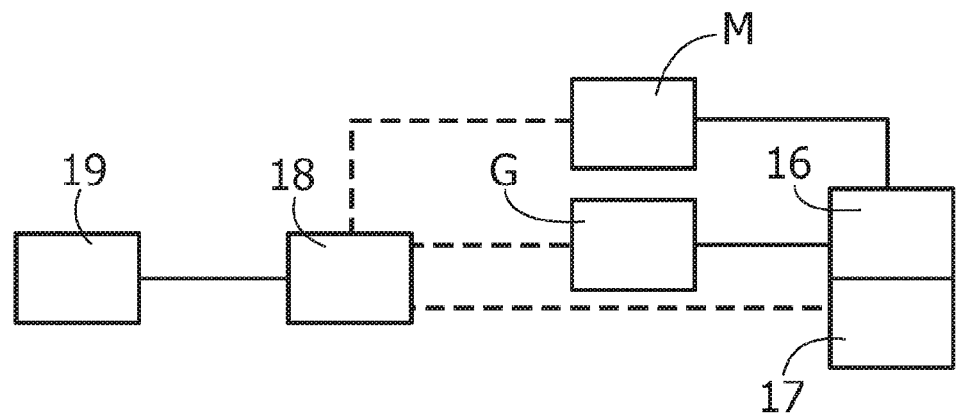
FIG. 4 is a diagram of the electronic control system of the bicycle simulator according to the invention.

The reference number 16 designates in FIG. 1 an electric battery for supply of the electric motor M associated to the front flywheel F1, associated to which is an ultracapacitor 17 that can be charged by the generator M associated to the rear flywheel F2. As may be seen in FIG. 4, the bicycle simulator is also provided with an electronic control unit 18 connected to the battery 16, to the ultracapacitor 17, to the generator G, and to the motor M. Associated to said control unit is a user-interface device 19, with display and control pushbuttons, for management and control of various modes of use of the bicycle simulator.

In use, the user activates the motor M for driving rotation of the front flywheel F1, preferably even before the user gets on the saddle of the bicycle simulator. Rotation of the flywheel F1 gives rise to a stabilizing gyroscopic effect that helps the user to find his balance once he has sat down on the saddle, notwithstanding the fact that the bicycle simulator is in a static position resting on the two areas of contact of the wheels 13, 14 with the floor 12. When the user starts to pedal, he impresses a rotation on the rear flywheel F2 that creates a further stabilizing gyroscopic effect. Rotation of the flywheel F2 enables the generator G to charge the battery 16, which in turn supplies the front electric motor M. An electric braking of a desired amount is applied to the flywheel F2 via the generator G, which can also function as motor so as to vary the effort of the user, according to the control set via the device 19.

In the case of the preferred embodiment described above, the bicycle simulator presents as a normal bicycle with disk wheels, which increases the attraction of said product for the user. In the second place, the use of two front and rear supports in the form of wheels 13, 14 enables simulation in an optimal way of the contact between wheels and road of a normal bicycle when it is ridden on the road.

Finally, the use of the front and rear wheels 13, 14 as supports for the bicycle simulator enables a further advantageous improvement of the invention that is described hereinafter.

With reference to FIG. 2, mounted on the two opposite disks D of the rear wheel 14, set at a distance from the axle of the wheel, are two powerful permanent magnets 20, the distance of which from the plane of the flywheel F2 is adjustable by means of any device suitable for said purpose. In the case of said embodiment, the flywheel F1 must be necessarily made of ferromagnetic material. In use, the magnets 20 tend, albeit to a minimal extent, to follow in rotation the flywheel F2, so that they provide a very low transmission ratio between the rotation of the flywheel F2 and the rotation of the wheel 14 in such a way that the bicycle simulator is displaced by a distance of the order of centimeters or a few meters in the course of a training session. It is with reference to said mode of use that in this description the expression "bicycle simulator for pseudo-static use" is adopted.

As has already been indicated above, said specific mode of use of the preferred embodiment of the invention adds attraction to the bicycle simulator according to the invention, enabling, for example, a number of users with the respective bicycle simulators to compete together in a room to reach a target set at a distance of a few meters in a time in the order of minutes or hours.

It should, however, be noted that the bicycle simulator according to the invention is characterized, as compared to the known art, also by a simpler embodiment, in which the front and rear supports are not constituted by wheels like the wheels 13, 14 described above.

Figure 5:
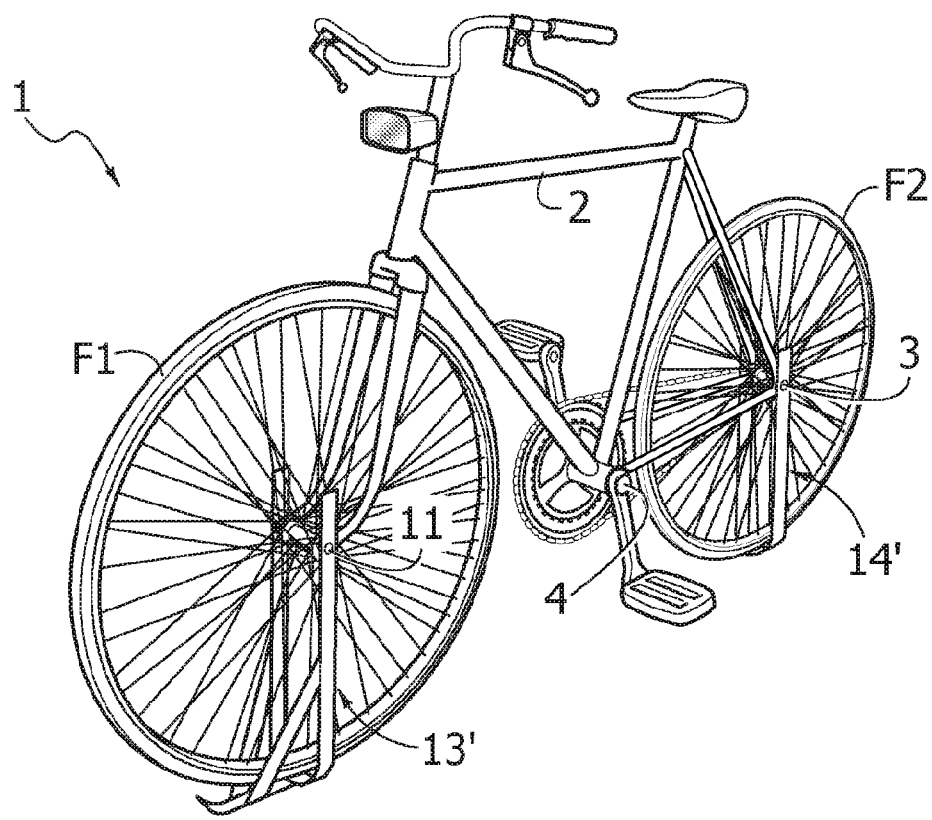
FIG. 5 is a perspective view of a simplified variant of the bicycle simulator according to the invention.

For example, the front and rear supports of the bicycle simulator can be constituted by the supports 13' and 14' illustrated in FIG. 5, and defined each by a forklike structure constituted by a bent strip, with a curved central part 21 that rests on the floor and two branches facing upwards, the ends of which support the axles 3, 11 in a rotatable way. The rounded central part 21 has a profile similar to that of the portion C of the wheels 13, 14 of FIGS. 1-3, to simulate the contact between the road and the wheels of a real bicycle.

The variant illustrated in FIG. 5 constitutes a simplified embodiment, which is obtained starting from a conventional bicycle, using the two wheels of the bicycle, without tyres, as flywheels F1 and F2 and without any motor for actuation of the flywheel F1. In the case of said simplified solution, the motor means that control rotation of the front wheel constituting the flywheel F1 can be of any type and may, for example, be constituted by an electric motor (not illustrated) or by a chain transmission (not illustrated) that connects the crank axle 4 to a pinion (not illustrated) associated to the axle 11 of the front flywheel F1 so that the action of the user on the pedals also causes rotation of said front flywheel F1. For adjustable braking of the rear wheel constituting the flywheel F2 there may also be envisaged any type of mechanical brake.

Figure 6:
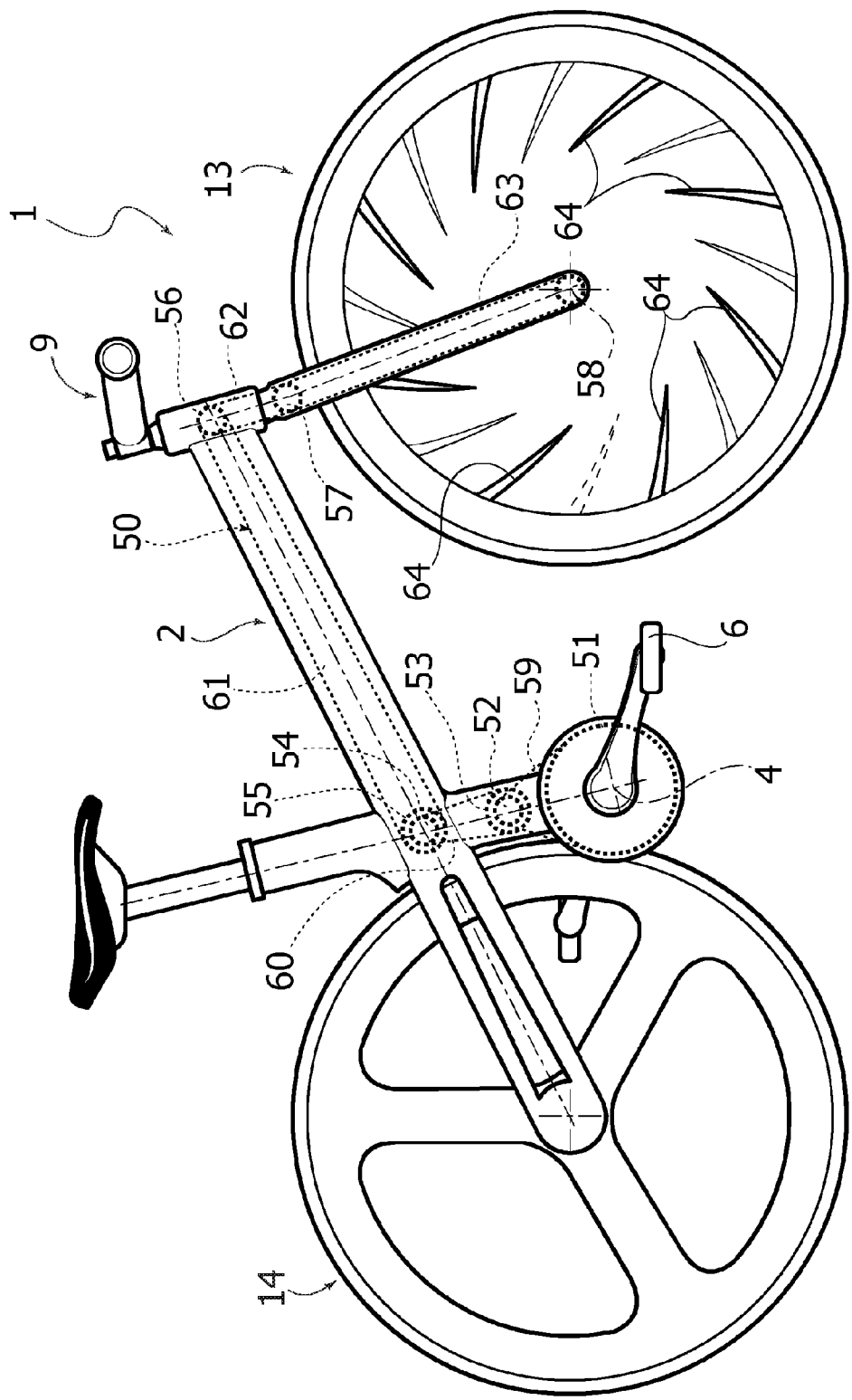
FIG. 6 illustrates a further variant.

FIG. 6 illustrates a further variant that differs from that of FIGS. 1-4 in that it envisages motor means for the front flywheel (not visible) constituted by a chain and belt transmission 50, for transmitting motion from the crank axle as far as the front flywheel. The transmission includes in sequence a crank wheel 51 fixed with respect to the crank axle and connected by a chain 59 to a wheel 52 coaxial to a wheel 53 connected by a chain or toothed belt 60 to a wheel 54. The wheel 54 is coaxial to a wheel 55 connected by a toothed belt 61 to a wheel 56 provided within the head tube, with the interposition of a small constant-velocity joint (not illustrated) that enables transmission notwithstanding rotation of the handlebar. The wheel 56 is connected by a toothed belt 62 to a wheel 57 provided within the tube of the fork. The belt 62 enables relative rotations between the axles of the wheels 56 and 57 due to rotation of the handlebar. If necessary, in any case there may be envisaged a transmission including a constant-velocity joint between the wheels 56 and 57. The wheel 57 is in turn connected with the interposition of a transverse shaft to a further wheel 57 aligned to a branch of the fork and connected via a toothed belt 63 to a wheel 58 that can turn together with the front flywheel (not visible in the drawing) with respect to the front supporting static wheel 13.

In the example illustrated in FIG. 6 no rear flywheel is envisaged, so that it is the front flywheel itself that functions as member driven by the crank axle. Once again in the case of said example (but this solution can be applied also to the embodiment of FIGS. 1-3) the two faces of the front static wheel 13, functioning as support resting on the floor, have a series of slits 64. The conformation of the flywheel internal to the front static wheel 13 is such that it functions also as axial fan, designed to take in air from the left face of the static wheel 13 through the slits 64 and expel it on the outside through the slits 64 on the right face, which is shaped to send the air at outlet to the user, who is thus ventilated during physical exercise, so as to simulate the action of the wind during use of a bicycle on the road.

According to a further characteristic (which can be adopted also in the embodiment of FIGS. 1-3) associated to the crank axle is a friction roller, in contact with the peripheral edge of the rear static wheel 14, in such a way as to transmit a very slow movement to said wheel (one degree of rotation of the wheel every n revolutions of the pedal), with a very low transmission ratio so that said bicycle simulator has the pseudo-static behaviour already described above, i.e., advances along the floor by a distance of the order of centimeters or of a few meters in the course of a training session for use according to the pseudo-static mode described above.

In a further embodiment of the invention, the front wheel is not a steering wheel so that the front fork is rigidly connected to the frame, without provision of a head tube and a steering shaft.

Of course, without prejudice to the principles of the invention, the details of construction and the embodiments may vary widely with respect to what is described and illustrated herein purely by way of example, without thereby departing from the scope of the present invention.

The invention claimed is:

1. bicycle simulator: comprising:
  a bicycle structure, including:
    a bicycle frame,
    a rear-wheel axle carried by the bicycle frame,
    a crank axle carried in a rotatable way by the bicycle frame and provided with cranks and corresponding pedals,
    a head tube carried by the bicycle frame and a steering shaft rotatably mounted in the head tube and carrying a fork, and
    a front-wheel axle carried by the fork;
  a front support and a rear support for supporting the bicycle simulator on a floor, said front and rear supports being associated, respectively, to the front-wheel axle and to the rear-wheel axle, and each of said supports having a portion of contact with the floor shaped in such a way as to simulate contact between a road and a wheel of a bicycle;
  at least one front flywheel rotatably mounted on said front-wheel axle; and
  motor means associated to said front flywheel for setting it in rotation in order to create a stabilizing gyroscopic effect;
  said crank axle being designed to impart a rotation on a driven member, which is independent of said front support and said rear support; and
  wherein said front and rear supports include front and rear static wheels, respectively, provided for resting on the floor.

2. The bicycle simulator according to claim 1, wherein at least the front static wheel has two opposite disks, which define a closed chamber within which said front flywheel is set.

3. The bicycle simulator according to claim 1, wherein said motor means associated to the front flywheel comprises an electric motor.

4. The bicycle simulator according to claim 3, wherein on board said bicycle simulator a battery is provided for supply of said electric motor.

5. The bicycle simulator according to claim 4, wherein associated to said battery is an accumulator circuit including an ultracapacitor.

6. The bicycle simulator according to claim 3, wherein said electric motor comprises a stator rigidly connected to said front-wheel axle and an annular rotor surrounding the stator and rigidly mounted within a central hub of said front flywheel.

7. The bicycle simulator according to claim 1, further comprising a rear rotor supported in rotation on said rear-wheel axle and connected to said crank axle by a transmission, and braking means for braking rotation of said rear rotor.

8. The bicycle simulator according to claim 7, wherein said braking means are adjustable.

9. The bicycle simulator according to claim 7, wherein said rear rotor is in the form of a flywheel designed to contribute also to creating a stabilizing gyroscopic effect.

10. The bicycle simulator according to claim 9, wherein said motor means associated to the front flywheel comprises an electric motor, wherein on board said bicycle simulator is a battery for supply of said electric motor for actuation of the front flywheel, and wherein said rear flywheel is mechanically connected to an electric generator provided for recharging said battery.

11. The bicycle simulator according to claim 10, wherein said electric generator is also designed to function as an electric motor and can be controlled in such a way as to provide an adjustable electric braking of rotation of the rear flywheel.

12. The bicycle simulator according to claim 10, further comprising an electronic control unit connected to said battery, to said electric motor, and to said generator.

13. The bicycle simulator according to claim 10, wherein said electric generator comprises a stator rigidly connected to said rear-wheel axle and an annular rotor surrounding the stator and rigidly mounted within a central hub of said rear.

14. The bicycle simulator according to claim 1, wherein the motor means comprises a mechanical transmission that connects the crank axle to the front flywheel.

15. The bicycle simulator according to claim 14, wherein no rear flywheel is provided.

16. The bicycle simulator according to claim 1, wherein the front supporting wheel has two side walls each having a series of openings, and wherein the conformation of the flywheel internal to the front supporting wheel is such that it functions also as a fan, designed to take in air on one side of the front supporting wheel through the respective openings and to expel it on the outside through the openings on the other side, said openings on the side for outlet of the air being shaped for orienting the air towards the user.

17. A bicycle simulator, comprising:
  a bicycle structure, including:
    a bicycle frame,
    a rear-wheel axle carried by the bicycle frame,
    a crank axle carried in a rotatable way by the bicycle frame and provided with cranks and corresponding pedals,
    a head tube carried by the bicycle frame and a steering shaft rotatably mounted in the head tube and carrying a fork, and
    a front-wheel axle carried by the fork;
  a front support having a front wheel and a rear support having a rear wheel for supporting the bicycle simulator on a floor, said front and rear wheels being associated, respectively, to the front-wheel axle and to the rear-wheel axle, and each of said front and rear wheels having a portion of contact with the floor and configured to simulate contact between a road and a wheel of a bicycle;
  at least one front flywheel rotatably mounted on said front-wheel axle; and
  motor means associated to said front flywheel for setting it in rotation in order to create a stabilizing gyroscopic effect at the front wheel;
  said crank axle being designed to impart a rotation on a driven member associated with the rear wheel.

18. The bicycle simulator according to claim 17, further comprising a rear flywheel made of metal material supported in rotation on said rear-wheel axle and connected to said crank axle by a transmission, and wherein associated to at least said rear wheel is at least one permanent magnet rigidly connected to said wheel, at a distance from the axle of the wheel, wherein the rear flywheel is configured to transmit rotation of the rear flywheel to said rear wheel with a transmission ratio that provides said bicycle simulator a pseudo-static behaviour defined by advancing the bicycle simulator along the floor in the course of a training session.

19. The bicycle simulator according to claim 18 wherein said at least one permanent magnet is fixed on the rear wheel at an adjustable distance from the plane of the flywheel.

20. The bicycle simulator according to claim 17, wherein associated to the crank axle is a friction roller, in contact with the peripheral edge of the rear supporting wheel, wherein the friction roller is configured to transmit movement to said wheel with a transmission ratio that provides said bicycle simulator a pseudo-static behaviour defined by advancing the bicycle simulator along the floor in the course of a training session.

* * * * *